US010494830B2

(12) United States Patent
Fabry et al.

(10) Patent No.: US 10,494,830 B2
(45) Date of Patent: Dec. 3, 2019

(54) METHOD FOR MANUFACTURING CONCRETE CONSTRUCTION BLOCKS FOR A WIND-TURBINE TOWER AND ASSOCIATED SYSTEM

(71) Applicant: SOLETANCHE FREYSSINET, Rueil Malmaison (FR)

(72) Inventors: Nicolas Fabry, Antony (FR); Benoit Melen, Bois Colombes (FR); Erik Mellier, Viroflay (FR)

(73) Assignee: SOLETANCHE FREYSSINET, Rueil Malmaison (FR)

( * ) Notice: Subject to any disclaimer, the term of this patent is extended or adjusted under 35 U.S.C. 154(b) by 0 days.

(21) Appl. No.: 15/522,579

(22) PCT Filed: Oct. 31, 2014

(86) PCT No.: PCT/FR2014/052774
§ 371 (c)(1),
(2) Date: Apr. 27, 2017

(87) PCT Pub. No.: WO2016/066907
PCT Pub. Date: May 6, 2016

(65) Prior Publication Data
US 2017/0314284 A1 Nov. 2, 2017

(51) Int. Cl.
*E04H 12/34* (2006.01)
*E04H 12/12* (2006.01)
(Continued)

(52) U.S. Cl.
CPC .......... *E04H 12/12* (2013.01); *B28B 7/0088* (2013.01); *B28B 15/00* (2013.01);
(Continued)

(58) Field of Classification Search
CPC ......... E04H 12/12; E04H 12/342; E04H 2/12; E04H 2/185; E04H 2/342; E04H 2/344;
(Continued)

(56) References Cited

U.S. PATENT DOCUMENTS 3,717,967 A * 2/1973 Wood ........................ E04B 2/54
52/259
4,082,120 A * 4/1978 Francois ............... B21F 27/127
138/175
(Continued)

FOREIGN PATENT DOCUMENTS

DE  10 2008 016 828 A1  10/2009
EP         1156175 A2    11/2001

*Primary Examiner* — Kyle J. Walraed-Sullivan
(74) *Attorney, Agent, or Firm* — Dentons US LLP

(57) ABSTRACT

The invention has for object a method for manufacturing concrete construction blocks (6) for a wind-generator tower made up of at least two consecutive blocks secured to one another by a contact surface of each of the two blocks, the manufacturing method comprising the following steps:
  pouring concrete into a first cage of reinforcements (10-1) so as to obtain the first concrete construction block comprising a first contact surface (9), and
  pouring concrete into a second cage of reinforcements (10-2) so as to obtain the second concrete construction block, the second cage of reinforcements being provided in a form (21) arranged such that the first contact surface (9) of the first block (6-1) makes up a wall for delimiting (26) the pouring of the concrete such as to form a contact surface (9) of the second block (6-2).

5 Claims, 3 Drawing Sheets

(51) Int. Cl.
  *F03D 13/20* (2016.01)
  *E04H 12/18* (2006.01)
  *B28B 7/00* (2006.01)
  *B28B 15/00* (2006.01)
  *B28B 23/02* (2006.01)
  *F03D 13/10* (2016.01)
  *B28B 17/00* (2006.01)
  *E04C 5/06* (2006.01)
  *E04G 11/06* (2006.01)

(52) U.S. Cl.
  CPC .......... *B28B 17/0063* (2013.01); *B28B 23/02* (2013.01); *E04C 5/0622* (2013.01); *E04G 11/062* (2013.01); *E04H 12/185* (2013.01); *E04H 12/342* (2013.01); *F03D 13/10* (2016.05); *F03D 13/20* (2016.05); *F03D 13/22* (2016.05); *F05B 2230/20* (2013.01); *F05B 2230/60* (2013.01); *F05B 2240/912* (2013.01); *Y02E 10/728* (2013.01); *Y02P 70/523* (2015.11)

(58) Field of Classification Search
  CPC .......... E04H 2/341; F03D 13/10; F03D 13/20; F03D 13/22; B28B 15/00; B28B 17/0063; B28B 23/02; B28B 7/0088; B28B 7/0063; B28B 23/022; E04G 11/062; E04C 5/0622; E04C 5/0618; E04C 5/0613; E04C 5/0609; F05B 2230/20; Y02P 70/523; Y02E 10/728
  USPC ... 52/745.18, 742.14, 223.14, 404.4, 745.17; 249/27, 40, 41, 42, 43, 190, 213, 214, 249/116
  See application file for complete search history.

(56) References Cited

U.S. PATENT DOCUMENTS

| | | | | |
|---|---|---|---|---|
| 4,083,908 A * | 4/1978 | Kalvenes | B28B 11/04 | 264/82 |
| 4,320,606 A * | 3/1982 | GangaRao | E04C 2/521 | 52/125.5 |
| 4,742,985 A * | 5/1988 | Mathis | E04G 9/06 | 249/153 |
| 4,917,346 A * | 4/1990 | Mathis | E04G 11/28 | 249/153 |
| 5,109,953 A * | 5/1992 | Mathis | E04G 11/28 | 182/129 |
| 5,375,810 A * | 12/1994 | Mathis | E04G 17/04 | 249/165 |
| 5,533,885 A * | 7/1996 | Schlusselbauer | B28B 3/021 | 425/185 |
| 6,983,824 B1 * | 1/2006 | Dandurand | E04G 1/38 | 182/150 |
| 8,505,244 B2 * | 8/2013 | Gomez | E04H 12/02 | 52/40 |
| 8,555,600 B2 * | 10/2013 | Cortina-Cordero | E04H 12/16 | 52/745.18 |
| 8,820,009 B2 * | 9/2014 | Johnson | E04H 12/30 | 220/567 |
| 9,637,944 B2 * | 5/2017 | Arlaban Gabeiras | E04H 12/342 | |
| 2003/0079420 A1 * | 5/2003 | Klassen | E04G 1/14 | 52/127.2 |
| 2003/0089074 A1 * | 5/2003 | Mathis | E04G 11/28 | 52/745.17 |
| 2003/0152429 A1 * | 8/2003 | Mathis | B63B 21/502 | 405/224 |
| 2005/0127268 A1 * | 6/2005 | Mathis | E04G 11/065 | 249/192 |
| 2008/0040983 A1 * | 2/2008 | Fernandez Gomez | E04H 12/12 | 52/40 |
| 2008/0209842 A1 * | 9/2008 | Montaner Fraguet | E04H 12/12 | 52/651.07 |
| 2009/0031639 A1 * | 2/2009 | Cortina/Cordero | E04H 12/12 | 52/40 |
| 2010/0132270 A1 * | 6/2010 | Willey | E02D 27/38 | 52/79.5 |
| 2010/0132282 A1 * | 6/2010 | Voss | E04C 5/07 | 52/223.5 |
| 2010/0139181 A1 * | 6/2010 | Cortina-Cordero | E04H 12/16 | 52/125.2 |
| 2010/0281818 A1 * | 11/2010 | Southworth | E02D 27/42 | 52/745.17 |
| 2011/0107708 A1 * | 5/2011 | Holscher | B28B 1/008 | 52/651.01 |
| 2011/0113708 A1 * | 5/2011 | Skjaerbaek | E04C 5/125 | 52/223.1 |
| 2011/0138704 A1 * | 6/2011 | Bagepalli | E04H 12/12 | 52/147 |
| 2011/0147122 A1 * | 6/2011 | Canham | E04G 3/20 | 182/150 |
| 2011/0243750 A1 * | 10/2011 | Gruhn | B29B 11/16 | 416/226 |
| 2012/0047816 A1 * | 3/2012 | Zhong | E04B 1/161 | 52/11 |
| 2012/0141295 A1 * | 6/2012 | Martinez De Castaneda | E04H 12/085 | 416/244 R |
| 2012/0311948 A1 * | 12/2012 | Hangel | B66C 1/66 | 52/295 |
| 2013/0001954 A1 | 1/2013 | Garcia Maestre et al. | | |
| 2013/0081337 A1 * | 4/2013 | Zavitz | E04H 12/344 | 52/123.1 |
| 2013/0125502 A1 * | 5/2013 | Walker | E02D 15/02 | 52/742.14 |
| 2014/0033628 A1 * | 2/2014 | Lockwood | E04H 12/16 | 52/223.5 |
| 2014/0102039 A1 * | 4/2014 | Wagner | F03D 80/50 | 52/745.18 |
| 2014/0157704 A1 * | 6/2014 | McDonagh | E04G 11/062 | 52/426 |
| 2014/0245671 A1 * | 9/2014 | Sritharan | F03D 11/04 | 52/173.1 |
| 2014/0345225 A1 * | 11/2014 | Rahimzadeh | E04B 1/30 | 52/414 |
| 2015/0061183 A1 * | 3/2015 | Eilola | B28B 5/04 | 264/238 |
| 2015/0167295 A1 * | 6/2015 | Baader | E04B 2/8635 | 249/40 |
| 2015/0184402 A1 * | 7/2015 | Gardner | E04G 3/28 | 182/131 |
| 2015/0267422 A1 * | 9/2015 | Tan | E04G 19/003 | 414/800 |
| 2016/0169192 A1 * | 6/2016 | Aranzadi De Miguel | E04H 12/12 | 52/30 |
| 2016/0201350 A1 * | 7/2016 | Zavitz | E02D 27/425 | 52/223.5 |
| 2017/0107715 A1 * | 4/2017 | Meilleur | E04B 2/8635 | |
| 2018/0215072 A1 * | 8/2018 | Del Zotto | B28B 21/90 | |

* cited by examiner

METHOD FOR MANUFACTURING
CONCRETE CONSTRUCTION BLOCKS FOR
A WIND-TURBINE TOWER AND
ASSOCIATED SYSTEM

This application is a 35 USC § 371 National Stage entry of International Application No. PCT/FR2014/052774, filed on Oct. 31, 2014, and claims benefit and priority thereto, which is hereby incorporated by reference in its entirety for all purposes as if fully set forth herein.

The invention relates to a method for manufacturing concrete construction blocks for a wind-generator tower made up of at least two consecutive blocks.

Typically, such a tower is surmounted by a nacelle and a rotor comprised of several blades in order to form the wind generator.

Two successive blocks are stacked on top of each other by a contact surface of each one of the two blocks.

It is known to manufacture each block by assembling on the installation site of the wind generator several panels, or by pouring concrete into a mould, for example of cylindrical shape. In this case, once the concrete has set, the unmoulding makes it possible to obtain the concrete construction block directly in the form of a single piece.

Two successive blocks are secured by a joint cast in concrete, even also using mortar or cement slurry according to the thickness of the joint on contact surfaces of each block.

These concrete joints are necessary because of the imperfections or geometrical irregularities inherent with the methods for manufacturing blocks, with the joint ensuring a continuity between the blocks.

However, such steps for constituting the joints using concrete poured on site have disadvantages. A sealed system has to be set up between each block at the time of the manufacture of the joint; and a minimum duration is required for the joint to be able to offer sufficient mechanical resistance. These steps are consequently long and complex to implement.

The purpose of the invention is to overcome these disadvantages at least partially.

To this effect, the invention has for object a method for manufacturing concrete construction blocks for a wind-generator tower comprised of at least one first block and one successive second block secured to one another by a contact surface of each of the two blocks, at least one block being carried out by a system for manufacturing using a cage of reinforcements, the manufacturing method comprising the following steps:
  pouring concrete into a form containing a first cage of reinforcements in such a way as to obtain a first concrete construction block comprising a first contact surface, and
  pouring concrete into a form containing a second cage of reinforcements in such a way as to obtain a second concrete construction block, the second cage of reinforcements being arranged in a form and the form being arranged such that the first contact surface of the first block makes up a wall for delimiting the pouring of the concrete such as to form a contact surface of the second block, referred to as second contact surface.

Thanks to the method according to the invention, the contact surfaces of the successive blocks are conjugated with one another, in such a way that it is not necessary to form or arrange concrete joints between each block on the site.

On the contrary, a simple adhesive, for example of the epoxy type, is sufficient to secure the blocks together via their contact surfaces. This epoxy adhesive makes it possible to re-establish a continuity, that is a priori sealed, without necessarily providing all of the resistance to the joint: in practice, passive reinforcements or a pre-stressed force are required for sufficient mechanical resistance.

According to another characteristic of the invention, during the step for pouring concrete in such a way as to obtain the second block, the first concrete block is arranged facing the form in such a way that they are in the extension of one another.

According to another characteristic of the invention, the form is positioned at a distance from a base of the system for manufacturing by about the dimension of the first concrete block in a direction orthogonal to the contact surface.

According to another characteristic of the invention, the dimension is a height of the first concrete block.

According to another characteristic of the invention, the method comprises a step of extracting the first concrete block outside of the system for manufacturing.

According to another characteristic of the invention, the method comprises a step of transporting each cage of reinforcements in the form.

The invention also has for object a system for manufacturing concrete construction blocks for a wind-generator tower comprised of a plurality of said construction blocks, two successive blocks of the tower intended to be secured to one another by a contact surface of each one the two successive blocks, the system for manufacturing comprising a form, a base and a means for arranging the form at a distance from the base of the system for manufacturing by about the dimension of a first concrete block in a direction orthogonal to the contact surface.

According to another characteristic of the invention, the form comprises two half-shells.

According to another characteristic of the invention, the means for arranging the form comprises two tables, with each table comprising a platform whereon a half-shell of the form rests.

According to another characteristic of the invention, the system comprises means for transporting each cage of reinforcements and/or block and/or form.

The invention also has for object a method for assembling a wind-generator tower, comprising:
  a step of manufacturing at least two concrete construction blocks obtained by the method of manufacturing such as described hereinabove,
  a step of transporting said at least two blocks, and
  a step of securing as a set of blocks said at least two blocks obtained during said step of manufacturing.

According to another characteristic of the invention, the method comprises a step of lifting said set of blocks.

According to another characteristic of the invention, the step of securing and the step of lifting are at least partially concomitant.

According to another characteristic of the invention, the step of securing a first set of blocks is at least concomitant with a second set of blocks.

Other characteristics and advantages of the invention shall further appear when reading the following description. The latter is purely for the purposes of information and must be read with regards to the annexed drawings wherein.

Figure 1:
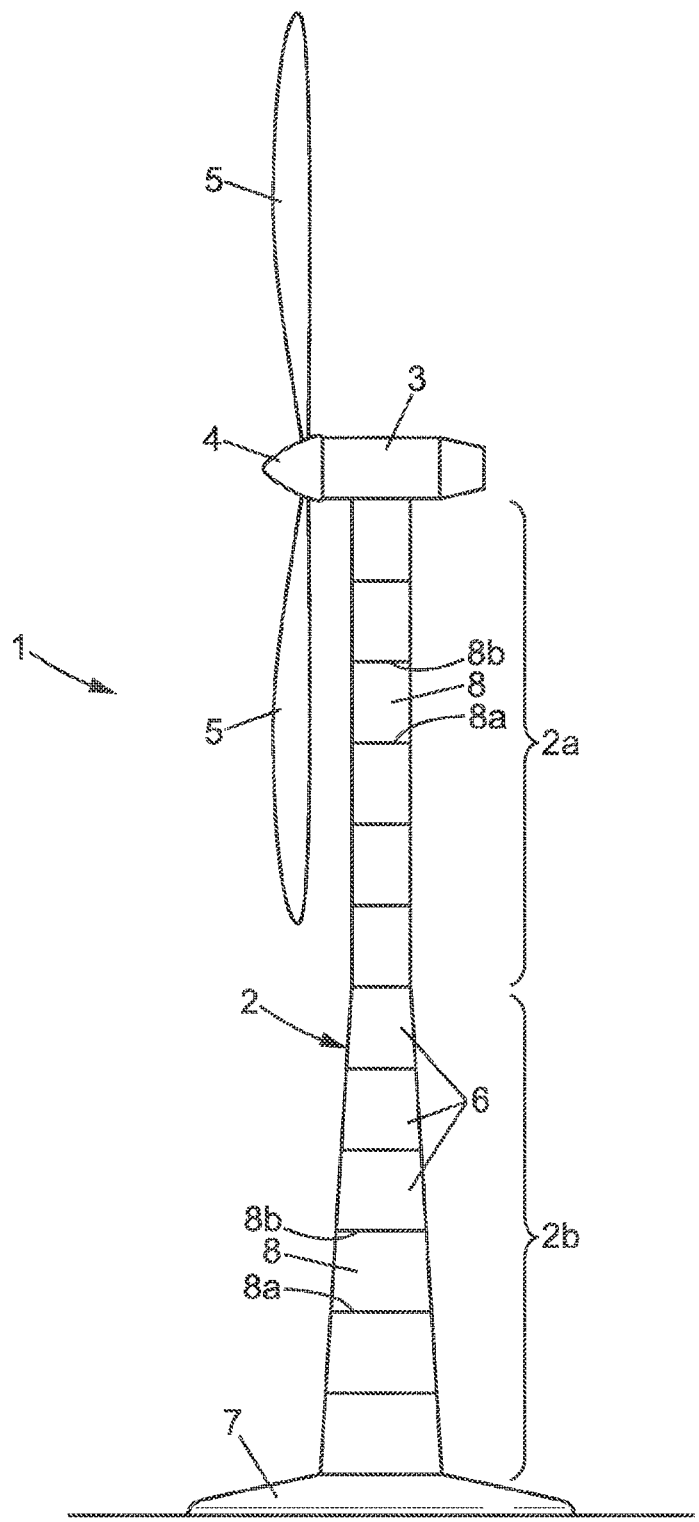
FIG. 1 shows a wind generator comprising a tower provided with cylindrical and tapered blocks assembled according to this invention.

As shown in FIG. 1, a wind generator 1 comprises a tower 2 overmounted with a nacelle 3 and a rotor 4 comprised of several blades 5.

The tower 2 comprises a plurality of blocks 6 stacked on top of one another, in such a way that the tower 2 has a generally extended shape.

In the rest of the description, it is considered that the tower 2 extends in a vertical direction.

The tower 2 is rigidly secured to a foundation or to a foundation slab 7.

The blocks 6 are preferably of the same height.

Each block 6 is formed using a material such as reinforced concrete.

As can be seen in FIG. 1, each block 6 of an upper portion 2a has a generally cylindrical shape while each block 6 of a lower portion 2b has generally tapered shape.

Of course, this invention does not apply solely to the tower 2 shown, and other forms of towers are possible, such as a tower comprised solely of cylindrical blocks or a tower comprised solely of tapered blocks.

Figure 2A:
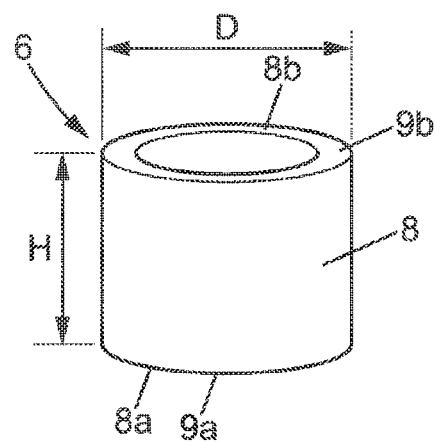
FIG. 2a shows a perspective view of a concrete cylindrical construction block obtained according to a step of manufacturing according to this invention.

As can be seen in FIG. 2a, the cylindrical block 6 has a height H and an outer diameter D.

Figure 2B:
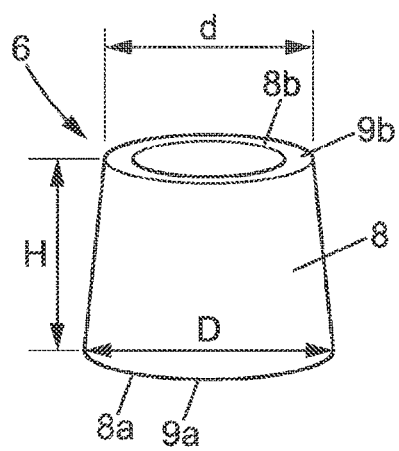
FIG. 2b shows a perspective view of a tapered concrete construction block obtained according to a step of manufacturing according to this invention.

As can be seen in FIG. 2b, the tapered block 6 has a height H, a large outer diameter D and a small outer diameter d less than the large diameter D.

Each block 6 is advantageously hollow.

Each block 6 comprises a lateral wall 8 limited by a so-called lower end 8a and an upper end 8b.

The lower end 8a of a given block 6 is in contact with the upper end 8b of the block 6 arranged below.

The lower ends 8a and 8b each comprise a ring, respectively referenced as 9a and 9b, which each extend in a plane orthogonal to the direction of the height H of the lateral wall 8.

Each ring 9a of a block 6 is facing and in contact with the ring 9b of the block arranged immediately thereunder in the tower 2, in such a way that each ring 9a, 9b, forms a contact surface between two successive blocks 6.

Each block 6 is made using a cage of reinforcements 10 assembled around an inner structure 11 of a form 21 of prefabrication.

Figure 3:
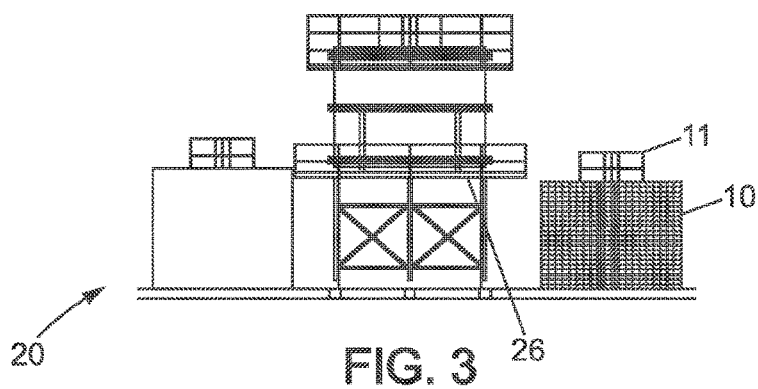
FIG. 3 is a side view of a system for manufacturing according to this invention.
Figure 4:
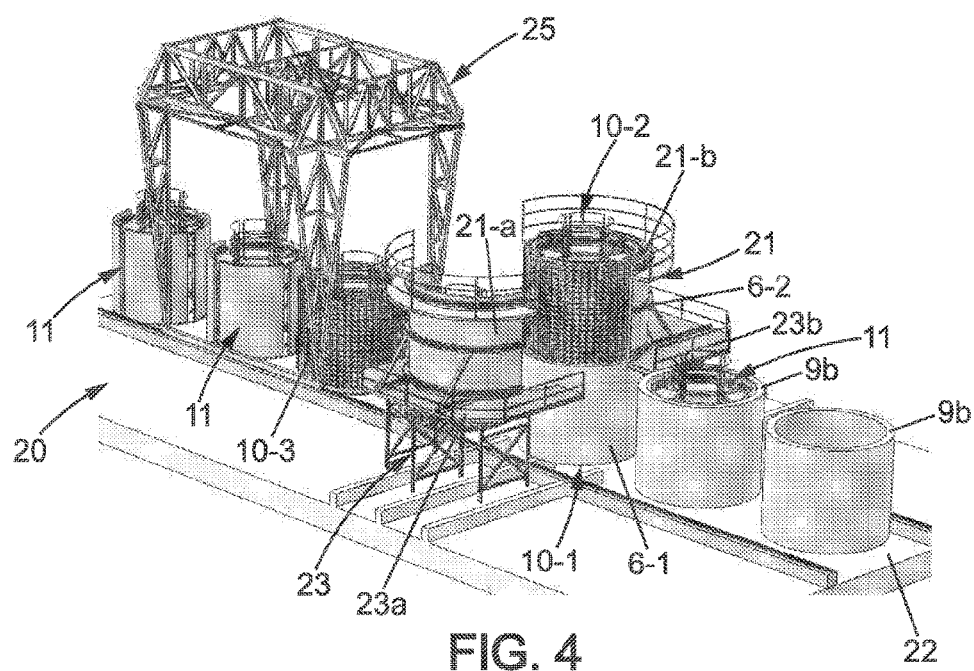
FIG. 4 shows a perspective view of the system for assembling of FIG. 3.

As can be seen in FIGS. 3 and 4, the system for manufacturing 20 comprises the form 21, a base 22 and a means 23 for arranging the form 21 at a given distance from the base 22.

This distance is about the height H.

The form 21 comprises two half-shells 21a and 21b.

The means 23 for arranging the form 21 comprise two tables 23a, 23b, with each table comprising a platform 24 whereon each half-shell of the form 21 bears.

The system 20 also comprises means for transporting 25 each cage of reinforcements, such as a bridge or gantry crane for example.

The system 20 comprises geometric control means of the dimensions of each block 6, via theodolite measurement for example.

The method for manufacturing according to this invention implements the system for manufacturing 20.

A first step consists in pouring concrete around a first cage of reinforcements 10-1 in such a way as to obtain a first construction block 6-1.

Note that the term "first" is not limiting of the first block manufactured by the method according to the invention but applies to one of the manufactured blocks, with the following block being arbitrarily denoted hereinafter as the "second" block.

The first block 6-1 comprises for example a contact surface which is for example the upper contact surface 9b if the first block 6-1 is intended to be the block of the tower arranged on the foundation 7 or to be at the bottom of the upper portion 2a of the tower 2.

A second step consists in pouring concrete around a second cage of reinforcements 10-2 in such a way as to obtain a second concrete construction block 6-2, with the second cage of reinforcements 10-2 being arranged in the form 21.

The two half-shells of the form 21 are then brought together until the two half-shells enclose the second cage of reinforcements 10-2.

As can be seen in particular in FIGS. 3 and 4, the form is arranged such that the first contact surface 9b of the first block 6-1 forms a boundary wall 26 for the casting.

The boundary wall 26 of the concrete makes it possible to form the lower contact surface 9a of the block 6-2.

The form 21 is preferably comprised of a plurality of rigid walls.

In order to form the lower contact surface 9a of the block 6-2, one of the walls of the form 21 is replaced with the contact surface 9b of the previously cast block 6-1, with the interface between the two blocks then forming a conjugated joint.

The two blocks 6-1 and 6-2 are detached after moulding of the second block 6-2, in particular thanks to a releasing product such as an oil, a wax or a soapy water coated on the contact surface 9b of the block 6-1 prior to the pouring of the concrete.

It is advantageous and often necessary to carry out the operations of geometric control of the form before the moulding of each block and of each newly moulded block.

As can be seen in FIGS. 3 and 4, during the second step, the first concrete block 6-1 is arranged facing the form 21 in such a way that the first concrete block 6-1 and the form 21 are in the extension of each other.

In other terms, the block 6-1 is arranged in the form 21, and the block 6-1 and the cage of reinforcements 10-2 are stacked according to the direction of the height H.

As already explained, during the method of manufacture, the form 21 is positioned above the base 22 at a height of about the height H of the block 6-1.

The method comprises a step of extracting the first concrete block 6-1 outside of the system 20. This step is subsequent to the step of manufacturing the second block 6-2, i.e. after demoulding by separation of the two half-shells of the form 21.

The method also comprises a step of transporting each cage of reinforcements 10 in the form 21 by the means for transporting 25.

Once the first block 6-1 is extracted, the second block 6-2 is placed under the form 21.

Then, a third cage of reinforcements 10-3 is transported in the form. The two half-shells encase or enclose the element 10-3 and the concrete is poured, with the boundary wall 26 of the upper end 8b of the block 6-2 allowing for the formation of the lower contact surface 9a of the third block 6-3.

Then, the second block 6-2 is extracted from the system 20 and the third block 6-3 lowered under the form 21.

The other blocks are manufactured by repeating the same method.

As such, according to the invention, two successive blocks are conjugated, i.e. the upper contact surface of the lower block is complementary with the lower contact surface of the immediately upper block in the tower 2.

For example, the contact surface 9b of the first block 6-1 is complementary with the contact surface 9a of the second block 6-2.

The contact surface 9b of the second block 6-2 is complementary with the contact surface 9a of the third block 6-3.

Note that the surface 9a of the first block manufactured and the surface 9b of the last block manufactured are not conjugated and formed simply according to a known technique of prior art, for example by adding a removable wall forming the mould bottom.

Figure 5:
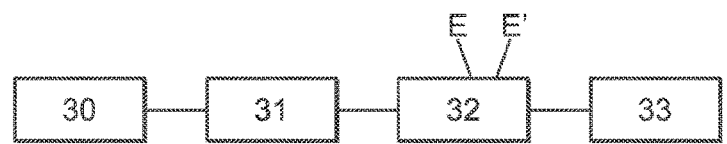
FIG. 5 shows a chronogram of a method for assembling the tower of FIG. 1 according to this invention.

The invention also relates to a method for assembling a wind-generator tower, shown in FIG. 5, comprising:
 a step of manufacturing 30 at least two concrete construction blocks 6 obtained by the method of manufacturing described hereinabove,
 a step of transporting 31 said at least two blocks, and
 a step of securing 32 as a set E of blocks of at least said two blocks 6.

However, it is also possible that certain blocks of the tower not be obtained by the method described hereinabove of conjugated joints.

Preferably, the method of assembly comprises a step of lifting 33 the set E of blocks 6, for example by a crane or any other suitable means for lifting.

Advantageously, the step of securing and the step of lifting are at least partially concomitant.

The wind-generator tower is comprised by the assembly of one or several sets of blocks, with the sets being lifted one after the other in such a way that the blocks are superimposed vertically.

Preferably, the step of securing a set E of blocks 6 is concomitant with the step of lifting of another set E' of blocks. In other terms, while one E of the sets is lifted, another set E' is secured.

As such, the wind-generator tower is assembled, at least partially, in masked time, since in parallel are carried out on the one had the securing of the blocks as a set of blocks, and on the other hand the lifting of the sets.

The method of assembling according to this invention makes it possible to save time and to save money.

This invention makes it possible to limit the duration required for the construction of the tower by limiting the number and the cumulative duration of manipulations of blocks, since the steps are carried out in parallel, on the installation site of the tower for a wind generator, as already mentioned.

In particular, the securing of the blocks together in order to constitute the tower for a wind generator is simplified, since the adhesive applied on the dry joints, for example of the epoxy type, is sufficient to constitute sealed joints, of a thickness that is practically zero and also limits the number and the duration of the operations of executing the joints or of the geometric control of the tower.

The full mechanical resistance of the joints can be provided by the presence of active pre-stressed reinforcements or passive reinforcements, known in prior art.

In addition, this invention provides good quality geometric continuity since the contact surfaces of the successive blocks are conjugated, as already explained.

The invention claimed is:

1. A method of manufacturing concrete construction blocks for a wind-generator tower comprised of at least a first block, a second block and a third block, the first block, second block, and third block being secured to one another by a contact surface of each of the first block, second block and third block, the method comprising the following consecutive steps:
 pouring concrete into a first cage of reinforcements so as to obtain the first block comprising a first contact surface;
 pouring concrete into a second cage of reinforcements so as to obtain the second block, the second cage of reinforcements being provided in a form, the first contact surface of the first block making up a wall for delimiting the pouring of the concrete to form a first contact surface of the second block,
 wherein a bottom surface of said form is spaced from a base of a system for manufacturing at a distance about a height of the first block in a direction orthogonal to the first contact surface;
 detaching the first block and the second block after moulding of the second block due to a releasing product coated on the first contact surface of the first block prior to the step of pouring of the concrete to form the second block;
 extracting the first block from said system for manufacturing;
 transporting the second block under said form; and
 pouring concrete into a third cage of reinforcements so as to obtain the third block, the third cage of reinforcements being provided in said form, a second contact surface of the second block making up a wall for delimiting the pouring of the concrete such as to form a first contact surface of the third block, the bottom surface of said form being spaced from the base of said system for manufacturing at a distance about a height of the second block in a direction orthogonal to the first contact surface,
 wherein each of the first block, second block and third block is hollow and comprises a lateral wall limited by a lower end and an upper end, said lower end forming the first contact surface of the block.

2. The method of claim 1, wherein, during the step for pouring concrete in such a way as to obtain the second block, the first block is arranged facing the form such that the first block and the second cage of reinforcements are extensions of one another.

3. A method for assembling a wind-generator tower, comprising:
 a step of manufacturing at least a first block, a second block, and a third block obtained by the method of manufacturing according to claim 1, and
 a step of transporting said first block, second block, and third block.

4. The method of claim 3, further comprising:
 a step of lifting said first block, second block, and third block.

5. The method of claim 1, further comprising:
 a step of geometric controlling of the form before the moulding of the first block, second block, third block and/or a step of controlling dimensions of each of the first block, second block, and third block.

* * * * *